(12) United States Patent
Wei et al.

(10) Patent No.: US 12,131,834 B2
(45) Date of Patent: Oct. 29, 2024

(54) METHOD OF CREATING AN OPTICAL ATOM TRAP AND ATOM TRAP APPARATUS, EMPLOYING AN INCOHERENT LIGHT FIELD

(71) Applicant: Max-Planck-Gesellschaft zur Foerderung der Wissenschaften e. V., Munich (DE)

(72) Inventors: Dawei David Wei, Munich (DE); Christian Gross, Garching (DE); Immanuel Bloch, Munich (DE)

(73) Assignee: Max-Planck-Gesellschaft zur Foerderung der Wissenschaften e. V., Munich (DE)

( * ) Notice: Subject to any disclaimer, the term of this patent is extended or adjusted under 35 U.S.C. 154(b) by 465 days.

(21) Appl. No.: 17/642,514

(22) PCT Filed: Sep. 10, 2020

(86) PCT No.: PCT/EP2020/075346
§ 371 (c)(1),
(2) Date: Mar. 11, 2022

(87) PCT Pub. No.: WO2021/048287
PCT Pub. Date: Mar. 18, 2021

(65) Prior Publication Data
US 2022/0344069 A1 Oct. 27, 2022

(30) Foreign Application Priority Data
Sep. 12, 2019 (EP) .................................. 19196945

(51) Int. Cl.
*G21K 1/00* (2006.01)
*H01S 3/00* (2006.01)

(52) U.S. Cl.
CPC .............. *G21K 1/006* (2013.01); *H01S 3/005* (2013.01)

(58) Field of Classification Search
CPC ....... G21K 1/006; H01S 3/005; H01S 3/0085; H01S 3/1306; H01S 2301/20; G02B 6/14; G02B 27/48
(Continued)

(56) References Cited
U.S. PATENT DOCUMENTS 7,705,990 B2 * 4/2010 Thrush .................. G01N 21/553
435/287.7
9,046,697 B2 6/2015 Manni et al.
(Continued)

OTHER PUBLICATIONS

Iwai et al., "Speckle Reduction in Coherent Information Processing", Proceedings of the IEEE, vol. 84, No. 5, pp. 765-781 (1996).
(Continued)

*Primary Examiner* — Jason L McCormack
(74) *Attorney, Agent, or Firm* — Caesar Rivise, PC

(57) ABSTRACT

A method of creating an optical atom trap comprises the steps of providing an incoherent light field with a light source apparatus, by creating a pulsed laser light beam of laser pulses with a repetition rate equal to or above 100 kHz and a relative spectral width of $10^{-4}$ to $10^{-2}$, coupling the pulsed laser light beam to an input end of a multimode waveguide device and guiding the pulsed laser light beam by total internal reflection to an output end of the multimode waveguide device, wherein the incoherent light field is provided at the output end, and creating the optical atom trap
(Continued)

for trapping atoms in an atom trap chamber device by coupling the incoherent light field to the atom trap chamber device, wherein the optical atom trap has a trap frequency and the atoms have multiple resonance frequencies, and the laser pulses for providing the incoherent light field are created such that the repetition rate is above the trap frequency and the spectral width is below a spectral range between the resonance frequencies. Furthermore, an optical atom trap apparatus for optically trapping atoms is described.

15 Claims, 1 Drawing Sheet

(58) Field of Classification Search
USPC .......................................................... 250/251
See application file for complete search history.

(56) References Cited

U.S. PATENT DOCUMENTS

| 9,413,372 | B1 | 8/2016 | Valley et al. | |
|---|---|---|---|---|
| 2014/0071406 | A1 | 3/2014 | Manni et al. | |
| 2018/0217385 | A1* | 8/2018 | Rivera | G02B 6/0288 |
| 2018/0292786 | A1 | 10/2018 | Sakai et al. | |
| 2021/0368612 | A1* | 11/2021 | Porte | G01C 19/62 |

OTHER PUBLICATIONS

Cao et al., "Complex Lasers With Controllable Coherence", Nature Reviews/Physics, vol. 1, pp. 159-168 (2019).
Ma, R..., "Engineered Potentials and Dynamics of Ultracold Quantum Gases Under the Microscope", Dissertation, Harvard University (2014).
Nakano et al., "Partially Coherent Light Generated by Using Single and Multimode Optical Fibers in a High-Power Nd: Glass Laser System", Applied Physics Letters, vol. 63, Issue 5, pp. 580-582 (1993).
Kim et al., "Speckle Reduction in OCT With Multimode Source Fiber", Optical Fibers and Sensors for Medical Applications IV, vol. 5317 (2004).
Dhalla et al., "Crosstalk Rejection in Parallel Pptical Coherence Tomography Using Spatially Incoherent Illumination With Partially Coherent Sources", Optics Letters, vol. 35, No. 13, pp. 2305-2307 (2010).
Grimm et al., "Optical Dipole Traps for Neutral Atoms", Advances in Atomic, Molecular, and Optical Physics, vol. 42 (2000).
Jayich et al., "Direct Frequency Comb Laser Cooling and Trapping", arxiv.org, Cornell University Library (2016).
Santic et al., "Cooling of Atoms Using an Optical Frequency Comb", Scientific Reports, vol. 9, No. 1 (2019).
International Search Report from corresponding PCT Application No. PCT/EP2020/075346 dated Nov. 12, 2020.

* cited by examiner

METHOD OF CREATING AN OPTICAL ATOM TRAP AND ATOM TRAP APPARATUS, EMPLOYING AN INCOHERENT LIGHT FIELD

CROSS-REFERENCE TO RELATED APPLICATIONS

This application is a U.S. National Phase Application of PCT/EP2020/075346, filed Sep. 10, 2020, which claims priority to EP 19196945.0, filed Sep. 12, 2019, the contents of which applications are incorporated herein by reference in their entireties for all purposes.

BACKGROUND OF THE INVENTION

Field of the Invention

The invention relates to a method of creating an optical atom trap, in particular a method of generating a dipole potential for trapping atoms, employing an incoherent light field. In particular, the incoherent light field is generated by guiding a pulsed laser light beam through a multimode waveguide device, so that the incoherent light field is provided at an output of the waveguide device. Furthermore, the invention relates to an atom trap apparatus. Applications of the invention are available in the field of trapping atoms in optical dipole traps.

Technical Background

In the present specification, reference is made to the following prior art illustrating the technical background of the invention:

[1] T. Iwai et al. "Speckle reduction in coherent information processing" In "Proceedings of the IEEE" 84, 765-781 (1996);
[2] H. Cao et al. "Complex lasers with controllable coherence" In "Nature Reviews Physics" 1, 156-168 (2019);
[3] R. Ma "Engineered potentials and dynamics of ultracold quantum gases under the microscope" Dissertation, Harvard University (2014);
[4] H. Nakano et al. "Partially coherent light generated by using single and multimode optical fibers in a high-power Nd: glass laser system" in "Applied physics letters" 63.5 (1993): 580-582;
[5] J. Kim et al. "Speckle reduction in OCT with multimode source fiber" in "Optical Fibers and Sensors for Medical Applications IV" Vol. 5317. International Society for Optics and Photonics (2004);
[6] A. H. Dhalla et al. "Crosstalk rejection in parallel optical coherence tomography using spatially incoherent illumination with partially coherent sources" In "Optics letters" 35.13 (2010): 2305-2307;
[7] U.S. Pat. No. 9,046,697 B2;
[8] R. Grimm et al. "Optical dipole traps for neutral atoms" In "Advances in Atomic, Molecular, and Optical Physics" Vol. 42 (2000): 95-170;
[9] US 2014/071406 A1;
[10] U.S. Pat. No. 9,413,372 B1;
[11] A. M. Jayich et al. "Direct frequency comb laser cooling and trapping" in arxiv.org, Cornell University Library, 26 Mar. 2016; and
[12] M. Santic et al. "Cooling of atoms using an optical frequency comb" in "Scientific reports" vol. 9, no. 1, 2019.

It is generally known, that spatial intensity noise is introduced in optical systems by partially reflecting optical surfaces and scattering particles (e.g. dust). The intensity noise results in image artefacts e.g. in full-field imaging applications. If the illuminating light is coherent, the artefacts are strongly enhanced since random high contrast interference patterns (speckles) emerge. Reducing temporal coherence thus reduces reflective noise and reducing spatial coherence reduces scattering noise.

As the focusing ability of light decreases with spatial incoherence, diffraction-limited microscopy requires control over the degree of coherence and a light source with high power per spatial mode. A spatially incoherent field behaves incoherently only for observation times which are much larger than the correlation time. Thus, if e.g. a microscopic imaging method needs short observation times, coherence time has to be minimized.

Furthermore, short coherence times require a broad spectrum, which may significantly affect the light source's intensity noise characteristics. However, applications in quantum technologies, e.g. atom trapping require low intensity noise in the frequency regime of 10 Hz to 10 MHz. Thus, in particular in the field of atom trapping, there is an interest in a bright, spatially incoherent light source featuring fast decorrelation (e.g. $\gg$10 MHz) and low temporal intensity noise.

Various techniques for providing incoherent light have been described in prior art. According to the modulation approach for spatial coherence reduction (see e.g. [1]), used commercially e.g. in laser projectors, a coherent beam passes through an optical diffuser generating a speckle pattern. By modulating the diffuser or the input beam, the speckle pattern is also modulated, which creates spatial incoherence. This technique has disadvantages in terms of a limited degree of coherence reduction and a reduction of output intensity by the diffuser. Alternatively, according to the complex laser approach (see e.g. [2]), lasers with spatially complex resonators are used where lasing occurs in multiple spatial modes. The resulting output is thus spatially incoherent. As a disadvantage, the complexity of the resonator configuration represents a restriction for routine applications in practice. Another approach uses the concept of temporal incoherence conversion by introducing propagation time delays in bulk optics, multi-core fibres or fibre bundles. For example, a broadband light-emitting diode is used in combination with bulk optics in [3] for creating an incoherent light field for an optical atom trap. However, using the broadband source has disadvantages in terms of intensity noise and adjusting the light field relative to resonance frequencies of the atoms to be trapped.

Incoherent light also can be generated by coupling an input light beam to a multimode optical fibre, exciting multiple modes guided in the optical fibre, superimposing the modes and thus providing the incoherent light field at an output of the optical fibre. Conventional techniques using the multimode optical fibre have been described e.g. in [4] to [7], [9] and [10], wherein parameters of the input light beam and the optical fibre have been selected in dependency on the particular application conditions. The conventional approaches using multimode optical fibres have limitations in terms of bandwidth and intensity noise of the incoherent light field, as well as repetition frequency thereof as outlined in the following.

According to [4], the application of an incoherent light field in a laser-induced inertial confinement fusion experiment is described. A low-repetition rate picosecond (ps) laser source creates the input light beam to be coupled to the multimode optical fibre. This type of narrowband laser source is adapted for providing incoherent light in the fusion experiment. However, due to the low-repetition rate of some kHz, it is not suitable for other applications, e.g. for illuminating a sample for short observation times in microscopy or for optically trapping atoms. Furthermore, due to the narrowband characteristic of the ps laser pulses, a large fibre length of about 100 m is required.

Contrary to the low-repetition rate used in [4], a femtosecond (fs) laser with a repetition frequency in the MHz range is used in [5] for providing incoherent light in optical coherence tomography (OCT). In this case, the input light beam to be coupled into the multimode optical fibre comprises fs laser pulse, i.e. it is spectrally far broader than the ps pulses used in [4]. With broadband pulses covering e.g. 50 nm ([5]), problems due to chromatic aberration effects may occur and adjusting the light field relative to resonance frequencies of trapped atoms in an optical atom trap is hindered. [6] also discloses an application of incoherent light in OCT, but uses a super-luminescent diode for creating the input light beam. As a disadvantage, the super-luminescent diode has a higher temporal noise compared with a laser source, thus restricting the application of this technique to OCT. According to [7], an input light beam emitted from laser diodes is coupled to the multimode optical fibre for incoherent image projection in cinema projection displays. Similar to [6], the laser diodes used in [7] suffer from the disadvantage of a limited temporal intensity and frequency stability. Furthermore, displayed images are magnified and not demagnified, so that controlling the degree of coherence is not considered in [7].

Trapping neutral atoms in an optical dipole trap by employing far detuned light, i.e. light detuned from the resonances of the atoms, is disclosed in [8]. Conventional optical dipole traps may have limitations in fidelity when spatially modulating the optical dipole potential in a programmable, arbitrary way. Furthermore, optically trapping atoms in magneto-optical traps is disclosed in [11] and [12]. In magneto-optical traps (MOT), atoms are decelerated and trapped by laser cooling. According to [11] and [12], continuous-wave lasers were replaced by frequency combs that are tuned to the resonance of the atoms and thus change their internal states.

OBJECTIVE OF THE INVENTION

The objective of the invention is to provide an improved method of creating an optical atom trap, being capable of avoiding disadvantages of conventional techniques. In particular, the method of creating an optical atom trap is to be suitable for trapping atoms in potentials prepared with higher fidelity and a predetermined trap potential shape. Furthermore, the objective of the invention is to provide an improved atom trap apparatus configured for trapping atoms, being capable of avoiding disadvantages of conventional techniques. In particular, the atom trap apparatus is to be capable to trap atoms in potentials prepared with higher fidelity and a predetermined trap potential.

SUMMARY OF THE INVENTION

These objectives are correspondingly solved by a method of creating an optical atom trap and an atom trap apparatus comprising the features of the independent claims, respectively. Preferred embodiments and applications of the invention arise from the dependent claims.

According to a first general aspect of the invention, the above objective is solved by a method of creating an optical atom trap, comprising the steps of providing an incoherent light field by creating a pulsed laser light beam of laser pulses (or: initial laser pulses), coupling the pulsed laser light beam to an input end of a multimode waveguide device and guiding the pulsed laser light beam to an output end of the multimode waveguide device, wherein the incoherent light field to be obtained is provided at the output end. Preferably, the pulsed laser light beam is created with a pulse laser source device. The laser pulses provide a periodic sequence of temporally separated, pulse-shaped light fields. The laser pulses have a central wavelength, a pulse duration (represented by the spectral width of the pulses in the frequency domain) and a repetition rate.

The multimode waveguide device comprises an optical waveguide, like e.g. an optical fibre, being capable of transmitting the pulsed laser light beam by total internal reflection. The multimode waveguide device has a cross-sectional dimension which is selected such that a plurality of guided spatial light modes, preferably at least 500 light modes, e.g. at least 1000 light modes can be accommodated by the multimode waveguide device. The initial laser pulses are coupled to the input end of the multimode waveguide device such that light modes among the plurality of light modes are excited. Light field portions of the laser pulses are guided by the excited light modes of the multimode waveguide device.

The incoherent light field to be obtained (or: output light field) is created by the superposition of the light field portions, i.e. the excited light modes, at the output end of the multimode waveguide device. Due to different propagation times of the light modes within the multimode waveguide device, the light beam at the output end of the multimode waveguide device is no longer coherent like the initial laser pulses. By propagating through the waveguide device, a spatially dependent propagation delay is applied onto the spectrally broadband (i.e. temporally incoherent) but spatially coherent initial laser pulses. The waveguide device is designed such that the differential mode delay (differences in delay times of excited light modes within the waveguide device) are longer than the coherence time of the initial laser pulses. This leads to spatial decorrelation, resulting in a spatio-temporally incoherent light field.

Since the multimode waveguide device is fully passive, potentially introduced noise by diffuser modulation is avoided and external global intensity stabilization can be easily implemented in contrast to complex lasers. In comparison to bulk optics, the necessary installation space at the output of the light source apparatus is also significantly reduced. As a further advantage, multimode waveguides, in particular fibres, also outperform waveguide bundles with respect to focusing ability since spatial modes are more loosely packed.

Coupling the pulsed laser light beam to the input end of the multimode waveguide device comprises irradiating, preferably focused irradiating, the input end with the initial laser pulses. Perpendicular incoupling comprises irradiating the input end with a direction of incidence parallel to the axial direction of the multimode waveguide device. Alternatively, oblique incoupling the laser pulses is possible. The input end of the multimode waveguide device comprises at least one end facet through which the laser pulses are transmitted into the waveguide.

Furthermore, the method of creating an optical atom trap comprises a step of creating the optical atom trap for trapping atoms in an atom trap chamber device by coupling the incoherent light field to the atom trap chamber device, wherein the optical atom trap has a trap frequency and the atoms have multiple resonance frequencies.

According to the invention, the initial laser pulses are created with a repetition rate equal to or above 100 kHz, preferably equal to or above 500 kHz, e.g. 1 MHz or higher. In contrast to [4], the repetition rate is substantially increased, thus providing an increased intensity of the output light field, resulting in advantages for atom trapping. In particular, in relation to typical trap frequencies of optical atom traps, the repetition rate is far above the trap frequencies, so that the trapping efficiency is substantially increased. An upper limit of the repetition rate should be significantly below the spectral bandwidth of about 100 GHz at 0.1 nm, while technical possibilities limit the range typically to about 1 GHz.

Furthermore, according to the invention, the initial laser pulses are created with a relative spectral width of $10^{-4}$ to $10^{-2}$. The relative spectral width is the spectral width of the laser pulses divided by the central wavelength thereof. For example, at a central wavelength of 1000 nm, the spectral width of the laser pulses preferably is in a range of 0.1 nm to 10 nm. Preferably, for most practically used central wavelengths, the spectral width is equal to or below 10 nm, e.g. equal to or below 6 nm or even equal to or below 1 nm. In contrast to [4], the spectral width of the initial laser pulses is increased, thus allowing a reduction of the length of the multimode waveguide device. Furthermore, in contrast to [5], the spectral width of the initial laser pulses is substantially reduced, thus facilitating an adjustment of the incoherent light relative to resonance frequencies of atoms in the optical atom trap. According to the relative spectral width of $10^{-4}$ to $10^{-2}$, the initial laser pulses preferably have a pulse duration in a range from 100 fs, e.g. 200 fs or 300 fs, to 10 ps, e.g. 5 ps or 3 ps.

The interval of relative spectral width used according to the invention has been found by the inventors by the following considerations. With a relative spectral width below $10^{-4}$, the coherence time would be increased such that impractical waveguide lengths would be required. With a relative spectral width above $10^{-2}$, disadvantages for the optical set-up would arise and chromatic aberration would be deteriorating for practical applications.

Furthermore, according to the invention, the laser pulses for providing the incoherent light field are created such that the repetition rate is above the trap frequency and the spectral width is below a spectral range between the resonance frequencies. Accordingly, the optical trap is an offresonant optical dipole trap.

Accordingly, with the method of creating an optical atom trap, an optical atom trap is created with the incoherent light field provided with the above light generation method. The optical atom trap is created for trapping atoms in an atom trap chamber device by coupling the incoherent light field to the atom trap chamber device, in particular by imaging the incoherent light field onto the atomic plane inside the atom trap chamber device. The optical atom trap is a dipole trap wherein the trap potential is formed with the incoherent light field. Accordingly, the inventive method of creating an optical atom trap can be indicated as a method of generating a dipole potential for trapping atoms (or: atomic potential generation method).

The optical atom trap is designed with a trap frequency and the atoms have multiple resonance frequencies. According to the invention, the laser pulses for providing the incoherent light field are created such that the repetition rate is above the trap frequency and the spectral width is below a spectral range between the resonance frequencies. In other words, all frequency components of the incoherent light are to be sufficiently detuned from atomic resonances. Thus the spectral bandwidth of the laser pulses used for creating the incoherent light is selected to be far below the spectral range between resonances.

According to a second general aspect of the invention, the above objective is solved by an atom trap apparatus employing an incoherent light field for trapping atoms. The atom trap apparatus comprises a pulse laser source device for emitting a pulsed laser light beam of laser pulses, and a multimode waveguide device having an input end and an output end and being arranged for receiving the pulsed laser light beam at the input end and guiding the pulsed laser light beam by total internal reflection. The multimode waveguide device is adapted for providing the incoherent light field at the output end thereof.

According to the invention, the pulse laser source device is configured for creating the laser pulses with a repetition rate equal to or above 100 kHz and a relative spectral width of $10^{-4}$ to $10^{-2}$, as explained above.

Furthermore, according to the invention, the atom trap apparatus comprises an atom trap chamber device configured for receiving the incoherent light field and creating an optical atom trap for trapping atoms having multiple resonance frequencies, said optical atom trap having a trap frequency, wherein the pulse laser source device is configured for creating the laser pulses such that the repetition rate is above the trap frequency and the spectral width is below a spectral range between the resonance frequencies Preferably, the atom trap apparatus or embodiments thereof are adapted for conducting the method of creating an optical atom trap according to the above first general aspect of the invention or an embodiment thereof.

Accordingly, an optical atom trap apparatus comprises the light source apparatus and an atom trap chamber device configured for receiving the incoherent light field and creating an optical atom trap for trapping atoms having multiple resonance frequencies. The atom trap chamber device comprises in particular an evacuable chamber with transparent windows and a cooling unit, a supply system for introducing atoms into the chamber, a magnet field device, monitoring devices and control devices. The optical atom trap is configured for an operation at a predetermined trap frequency. The pulse laser source device of the light source apparatus is configured for creating the laser pulses such that the repetition rate is above the trap frequency and the spectral width is below a spectral range between the resonance frequencies.

Preferably, the optical atom trap apparatus generates a conservative trap, which does not or neglectably change the internal states and typically starts from already pre-cooled atoms (pre-cooled e.g. by MOTs, magnetic traps, other optical dipole traps etc.).

The invention employs incoherent light which is generated based on a separation of light generation and spatial decorrelation. This enables high flexibility in varying required coherence properties, in particular controlling the degree of coherence, spectral widths and intensity properties, and minimizes realignment efforts. Advantageously, the invention uses a high-brightness, low-noise, spatially incoherent laser source, enabling speckle-free, high intensity, low temporal intensity noise, and efficient illumination in atom trapping.

The inventors have found that the above properties of the light field directly affect the optical dipole trap in an advantageous manner as follows. The high brightness results in a deeper trap potential, i.e. a "stronger" trap, compared with the potential of a conventional optical dipole trap created with another broadband, low-noise light source (e.g. superluminescent diode) suitable for use as an incoherent light source. Furthermore, the low (temporal) noise results in less heating of the trapped atoms, i.e. less noise leading to atomic state changes. Advantages are obtained in particular for quantum simulation applications where keeping the atoms isolated from external perturbations is crucial. Furthermore, the low spatial noise and high spatial incoherence allows a higher fidelity of potentials projected onto the atoms. Finally, the reduced complexity and increased efficiency of incoherent light generation provides the same advantages for the atom trap apparatus itself.

Particular advantages of the incoherent light generation employed according to the invention are obtained, if dynamically switchable, arbitrary potentials are to be set. As typical use cases of the invention would modulate the optical dipole traps on the (small) wave-length scale, complex output optics for imaging the light field into the atom trap chamber device with sufficient focusing and/or field modulation (shaping) capability may be required. Imperfections of the output optics would lead to unwanted speckles or disorder in the trap potential, thus limiting its performance. With the inventive application of high-brightness incoherent light, the disorder is so small that no additional, shape-specific correction is necessary. Furthermore, for far-off resonant light, the achievable dipole trap depth is limited by the available optical power. This is particularly the case when applying spatial light modulation (e.g. with a digital micro-mirror device), as a very large portion of light can be lost. The usable power is thus increased by using a higher initial power (fs laser) and having more efficient use e.g. with uniform illumination (multimode fibre).

Any type of optical waveguide with a suitable differential mode delay can be employed as the multimode waveguide device, like optical fibres or monolithic waveguides on substrates. As an example, optical fibres with a circular cross-sectional shape may have advantages in terms of large number of variants of commercially available fibres.

According to a preferred embodiment of the invention, the multimode waveguide device has a circularly asymmetrical cross-sectional shape. This shape provides advantages in terms of a high coupling efficiency with perpendicular incoupling to the waveguide device. The use of the circularly asymmetrical shape minimizes the modal overlap with the waveguide-launched Gaussian profile. Thus the dependency on launching conditions is reduced and fluctuations due to coupling instabilities are avoided.

Particularly preferred, the multimode waveguide device comprises a square core optical fibre. Advantageously, square core optical fibres are commercially available from applications in astronomy. Furthermore, the square-core geometry has advantages due to insensitivity to fibre coupling conditions, again minimizing temporal intensity fluctuations and also leading to a uniform output intensity distribution. This additionally allows under-filling launch conditions without mode scramblers, significantly increasing transmission efficiency. As a further advantage for imaging applications, choosing an appropriate core geometry allows matching the image format (e.g. square core for quadratic image).

According to a further preferred variant of the invention, the multimode waveguide device has a longitudinal length of at least 80 cm, in particular at least 300 cm. These preferred values are used e.g. with an embodiment including 1000 incoherent waveguide modes at $10^{-2}$ spectral width and a numerical aperture (NA) of 0.48 NA of the waveguide input end. On the other hand, depending on the spectral width, the length might significantly exceed 20 m, which is technologically unproblematic, and typically is below 1 km. The multimode waveguide device preferably has a numerical aperture equal to or above 0.2, e.g. 0.22 or higher, or in particular equal to or above 0.3, e.g. 0.39 or higher.

If according to a further preferred embodiment of the invention, laser pulses are generated with a mode-locked pulse laser, particularly preferred with a mode-locked femtosecond laser, further advantages relating to brightness and temporal stability are obtained. Laser pulses created with the mode-locked pulse laser are described in frequency domain as frequency combs. The frequency comb properties additionally allow for low intensity noise operation (below its repetition rate) not reached with complex lasers or (superluminescent) diodes as light sources, enabling in particular high-power and high-speed imaging applications.

Another advantage of the invention, in particular of employing the mode-locked pulse laser is obtained as intensity stabilization can be straightforwardly implemented. Thus, according to a further, particularly preferred embodiment of the invention, the light generation method includes an active stabilization of the output power of the incoherent light field, in particular the step of stabilizing the output power of the incoherent light field at the output end of the multimode waveguide device by employing a feedback stabilization loop device. According to this embodiment, the light source apparatus further comprises a feedback stabilization loop device arranged for stabilizing the output power of the incoherent light field at the output end of the multimode waveguide device. Active stabilization comprises detecting the power of the initial laser pulses or preferably the output light field power and controlling the power of the initial laser pulse coupled into the waveguide device in dependency of the detected power of the initial laser pulses or output light field power. The power of the initial laser pulses is controlled by direct control of the pulse laser source device or preferably by controlling an acousto-optical modulator arranged between the pulse laser source device and the input end of the waveguide device. Advantageously, controlling in dependency on the output light field power allows for stabilization of noise introduced between the pulse laser source device and the output end of the multimode fibre. Alternatively, due to the low or neglectable sensitivity to coupling-fluctuations into the waveguide device, the stabilization of only the pulse laser source device is possible.

BRIEF DESCRIPTION OF THE DRAWINGS

Further details and advantages of the invention are described in the following with reference to the attached drawings, which show in.

DETAILED DESCRIPTION

Features of preferred embodiments of the invention are described in the following with reference to a light source apparatus, wherein the waveguide device comprises an optical fibre, the pulse laser source device comprises a fs pulse laser and the power of the output light field is actively stabilized using a control loop. It is noted that the implementation of the invention is not restricted to these features. Depending on the application of the invention, another waveguide device or pulse laser source device can be used and/or the active stabilization can be omitted. Further optical components can be added. For instance, the pulse laser source device can be provided with a mode filter, like a single mode fibre. Exemplary reference is made to an optical atom trap apparatus, which is operated with the incoherent light provided according to the invention. Details of operating the optical atom trap apparatus are not described as they are known per se from conventional techniques.

Figure 1:
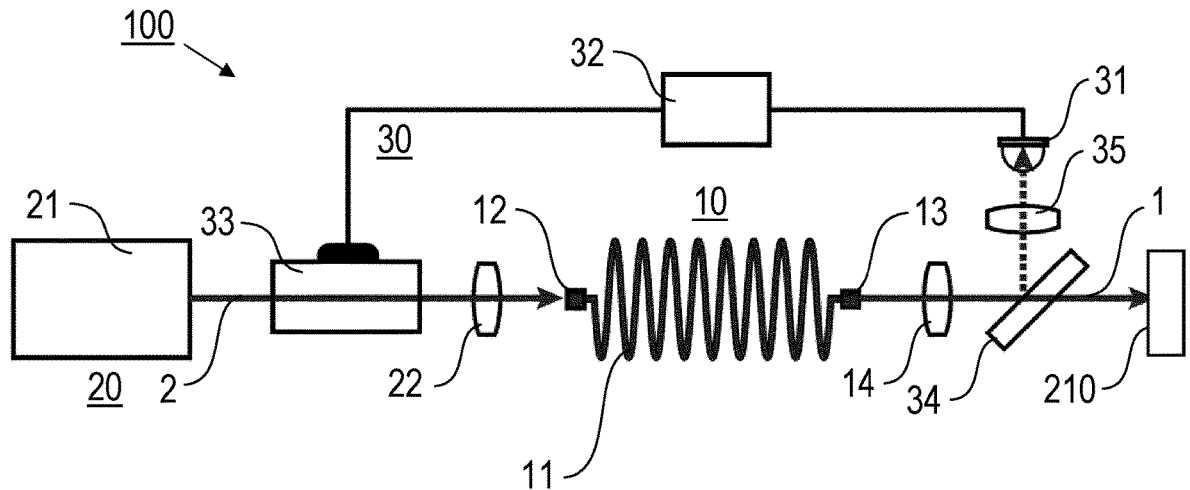
FIG. 1: a schematic illustration of a light source apparatus with features according to preferred embodiments of the invention.

According to FIG. 1, an embodiment of the light source apparatus 100 for creating incoherent light 1 and an atom trap comprises a waveguide device 10, including an optical fibre 11 with an input end 12 and an output end 13. The optical fibre 11 is a square-core (or other circularly asymmetrical) multimode optical step-index fibre, e.g. with a core dimension of 150 μm*150 μm and a length of 300 cm, made of e.g. fused silica. Each of the input and output ends 12, 13 comprise flat smooth end facets. The input end 12 can be provided with an anti-reflective coating (not shown). The optical fibre 11 can be arranged with a straight or curved shape, e.g. in a protective container.

Furthermore, the light source apparatus 100 has a pulse laser source device 20, which comprises a mode-locked femtosecond pulse laser 21, e.g. a frequency-doubled Er laser or a Ti-sapphire laser. The fs pulse laser 21 generates spatially coherent light providing a pulsed laser light beam 2 of laser pulses to be coupled via focusing optics 22 (coupling lens in) to the optical fibre 11. With a practical example, the pulsed laser light beam 2 has a repetition frequency of 80 MHz, a central wavelength of 700 nm to 800 nm, a spectral width of 5 nm and an average power of 0.2 W. The mode-locked femtosecond laser 21 provides spectral widths of multiple nanometres which allows fast decorrelation. Its comb-like spectrum gives rise to well-defined beating frequencies in the range of hundreds of MHz such that the intensity noise spectrum (apart from these beating frequencies) is similarly low as that of single-mode lasers.

By coupling the pulsed laser light beam 2 to the optical fibre 11 accommodating multiple fibre modes, fast decorrelation is obtained. The optical fibre 11 provides a delaying element with different propagation times for each of the fibre modes. In the picture of totally internally reflected light rays, straightly propagating rays arrive at the output end 13 earlier than rays travelling at an angle since the distance covered is longer. In an electromagnetic wave picture, the different rays correspond to different spatial modes. Since the spatial modes have distinct intensity profiles, the spatial decorrelation is achieved, so that the incoherent light field 1 is output at the output end 13 of the optical fibre 11.

Figure 2:
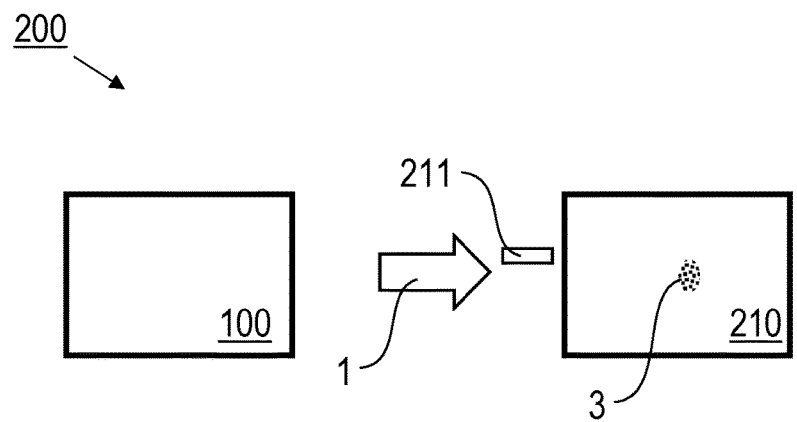
FIG. 2: a schematic illustration of an optical atom trap apparatus with features according to preferred embodiments of the invention.

The fibre output end 13 acts as a secondary, incoherent light source, and is imaged with an output optics 14 (coupling lens out) into an atom trap chamber device 210 (see FIG. 2).

The light source apparatus 100 is provided with a feedback stabilization loop device 30, comprising a photodiode 31, a feedback control unit 32 and an acousto-optical modulator (AOM) 33. A portion of the output light field 1 is deflected with a beam sampler 34, e.g. a semi-transmissive plate, and a focusing lens 35 to the photodiode 31. Depending on the current power of the output light field 1, the feedback control unit 32 drives the AOM 33, such that possible temporal power changes are compensated and the output light field 1 has a constant power. By driving the AOM 33, the transmission of the pulsed laser light beam 2 is modified. To this end, preferably a mode filter (not shown) is arranged between the femtosecond pulse laser 21 and the AOM 33. Thus, a feedback-based intensity stabilization may be installed and residual temporal noise of the femtosecond pulse laser 21 is minimized.

According to FIG. 2, an embodiment of an optical atom trap apparatus 200 according to the invention comprises the light source apparatus 100 of FIG. 1 and a schematically illustrated atom trap chamber device 210. By focusing the incoherent light field 1 into the atom trap chamber device 210, an atom trap 3, in particular a trapping potential thereof, is formed. The atom trap chamber device 210 has a configuration and is operated as known per se in prior art, e.g. as described in [8]. A digital micro-mirror device 211 (arrangement schematically shown) can be provided for spatially modulating the shape of the light field and generating a shape of the atom trap 3.

The features of the invention disclosed in the above description, the drawings and the claims can be of significance individually, in combination or sub-combination for the implementation of the invention in its different embodiments.

The invention claimed is:

1. Method of creating an optical atom trap, comprising the steps of:
providing an incoherent light field by creating a pulsed laser light beam of laser pulses with a repetition rate equal to or above 100 kHz and a relative spectral width of $10^{-4}$ to $10^{-2}$, coupling the pulsed laser light beam to an input end of a multimode waveguide device and guiding the pulsed laser light beam by total internal reflection to an output end of the multimode waveguide device, wherein the incoherent light field is provided at the output end, and
creating the optical atom trap for trapping atoms in an atom trap chamber device by coupling the incoherent light field to the atom trap chamber device, wherein
the optical atom trap has a trap frequency and the atoms have multiple resonance frequencies, and
the laser pulses for providing the incoherent light field are created such that the repetition rate is above the trap frequency and the spectral width is below a spectral range between the resonance frequencies.

2. Method according to claim 1, wherein the multimode waveguide device has at least one of the features
the multimode waveguide device has a circularly asymmetrical cross-sectional shape,
the multimode waveguide device comprises a square core optical fibre, and
the multimode waveguide device has a longitudinal length of at least 80 cm.

3. Method according to claim 1, wherein
the pulsed laser light beam is created with a mode-locked pulse laser.

4. Method according to claim 1, further comprising
stabilizing the output power of the incoherent light field at the output end of the multimode waveguide device by employing a feedback stabilization loop device.

5. Method according to claim 1, wherein
the incoherent light field is spatially modulated by and a trap potential of the atom trap is generated with a digital micro-mirror device.

6. Method according to claim 1, wherein
the optical atom trap is an optical dipole trap.

7. Optical atom trap apparatus, comprising:
a light source apparatus including a multimode waveguide device having an input end and an output end and being arranged for receiving a pulsed laser light beam at the input end and guiding the pulsed laser light beam by total internal reflection, wherein the multimode waveguide device is adapted for providing an incoherent light field at the output end, and a pulse laser source device arranged for creating the pulsed laser light beam of laser pulses with a repetition rate equal to or above 100 kHz and a relative spectral width of $10^{-4}$ to $10^{-2}$, and an atom trap chamber device configured for receiving the incoherent light field and creating an optical atom trap for trapping atoms having multiple resonance frequencies, said optical atom trap having a trap frequency, wherein the pulsed laser source device is configured for creating the laser pulses such that the repetition rate is above the trap frequency and the spectral width is below a spectral range between the resonance frequencies.

8. Optical atom trap apparatus according to claim 7, wherein
the multimode waveguide device has a circularly asymmetrical cross-sectional shape.

9. Optical atom trap apparatus according to claim 7, wherein
the multimode waveguide device comprises a square core optical fibre.

10. Optical atom trap apparatus according to claim 7, wherein
the multimode waveguide device has a longitudinal length of at least 80 cm.

11. Optical atom trap apparatus according to claim 7, wherein
the pulse laser source device comprises a mode-locked pulse laser.

12. Optical atom trap apparatus according to claim 7, further comprising
a feedback stabilization loop device arranged for stabilizing the output power of the incoherent light field at the output end of the multimode waveguide device.

13. Optical atom trap apparatus according to claim 7, wherein
the light source apparatus is arranged in combination with an atom trap chamber device configured for receiving the incoherent light field and creating an optical atom trap for trapping atoms having multiple resonance frequencies, said optical atom trap having a trap frequency, and
the pulse laser source device is configured for creating the laser pulses such that the repetition rate is above the trap frequency and the spectral width is below a spectral range between the resonance frequencies.

14. Optical atom trap apparatus according to claim 7, further comprising
a digital micro-mirror device being arranged for shaping the incoherent light field and selecting a shape of the atom trap.

15. Optical atom trap apparatus according to claim 7, wherein
the optical atom trap is an optical dipole trap.

* * * * *